United States Patent [19]

Fukuda et al.

[11] Patent Number: 4,860,129
[45] Date of Patent: Aug. 22, 1989

[54] SIGNAL REPRODUCING DEVICE

[75] Inventors: Nobutoshi Fukuda; Tatsuro Nagao; Naoto Arifuku; Masashi Tanabe; Shinichi Yamamisaka; Yoshiki Furuta, all of Saitama, Japan

[73] Assignee: Pioneer Electronic Corporation, Tokyo, Japan

[21] Appl. No.: 150,275

[22] Filed: Jan. 29, 1988

[30] Foreign Application Priority Data

Jan. 29, 1987 [JP] Japan ............................ 62-11865[U]

[51] Int. Cl.⁴ .......................... G11B 15/12; G11B 5/02
[52] U.S. Cl. ......................................... 360/61; 360/67
[58] Field of Search ....................... 360/61, 60, 32, 67, 360/38

[56] References Cited

U.S. PATENT DOCUMENTS 4,323,934 4/1982 Giraud ................................. 360/61

Primary Examiner—Vincent P. Canney
Attorney, Agent, or Firm—Sughrue, Mion, Zinn, Macpeak & Seas

[57] ABSTRACT

In a signal reproducing device such as an R-DAT video tape recorder, a digital signal recorded on the recording medium is reproduced by the magnetic head, stored in a memory, processed by a processing circuit, and converted into an analog signal by a D/A converter, and a detector detects whether or not the reproduction signal outputted by the head is present so that, according to the output of the detector, a muting circuit mutes the digital-to-analog converted signal and a driver suspends the operation of a level meter adapted to display the level of the digital signal, whereby the production of noise signals and the abnormal display of signal levels are prevented.

6 Claims, 2 Drawing Sheets

SIGNAL REPRODUCING DEVICE

BACKGROUND OF THE INVENTION

The present invention relates to a signal reproducing device such as an R-DAT and an 8-mm video tape recorder.

FIG. 1 is a block diagram of a conventional R-DAT. In FIG. 1, reference numeral 1 designates a magnetic head for reading digital signals recorded on a magnetic medium such as a magnetic tape (not shown). The output signal (RF signal) of the head 1, after being amplified by an head amplifier 2, is applied to a demodulator circuit 3, where it is demodulated. The demodulator circuit 3 has a processing circuit 4 and a memory (RAM) 5. The demodulated digital signal is stored in the memory 5. The data stored in the memory 5 is subjected to deinterleaving and error correction by the processing circuit 4, the output of which is applied to a D/A (digital-to-analog) converter circuit 6. The D/A converter circuit 6 converts the digital signal into an analog signal, which is applied to a loudspeaker (not shown) or the like.

The demodulated digital signal is further applied to a driver 8. The driver 8 samples the digital signal with a predetermined period and outputs a signal corresponding to the level of the sampled signal. The output signal is applied to a level meter 9, where its level is displayed.

Further in FIG. 1, reference numeral 7 designates a control circuit implemented with a microprocessor. The control circuit 7 is adapted to control various circuits including the demodulator circuit 3.

In the conventional device thus constructed, the output signal from the head 1 is converted into an analog signal, the level of which is displayed by the level meter 9 at all times. Therefore, when, for instance, the head 1 traces an unrecorded (blank) region following a data-containing region, the DC data remaining in the processing circuit 4 or the memory 5 is outputted through D/A conversion, thus forming a noise signal. Furthermore, unnaturally the level of the DC data is displayed on the level meter 9.

SUMMARY OF THE INVENTION

Accordingly, an object of the present invention is to eliminate the above-described difficulties accompanying a conventional signal reproducing device.

More specifically, an object of the invention is to provide a signal reproducing device which is capable of preventing the production of noise signals and the abnormal display of signal levels.

The foregoing object and other objects of the invention have been achieved by the provision of a signal reproducing device which, according to the invention, comprises a magnetic head for reading digital signals recorded on a recording medium, a memory for storing digital signals outputted by the head, a processing circuit for processing the digital signal stored in the memory, a digital-to-analog converter circuit for subjecting the digital signal processed by the processing circuit to digital-to-analog conversion, a level meter for displaying the level of the digital signal, a detector circuit for detecting the presence or absence of a reproduction signal outputted by the head, a muting circuit for muting a signal which is digital-to-analog converted and outputted according to the output of the detector circuit, and a driver for suspending the display of the level meter according to the output of the detector circuit.

In the device thus constructed, the head reproduces the digital signals recorded on the recording medium, and the digital signals thus reproduced are stored in the memory. The processing circuit processes the signal stored in the memory and supplies it to the D/A converter circuit. The D/A converter circuit converts the input signal to an analog signal. The level of the digital signal is displayed on the level meter. On the other hand, the detector circuit detects the presence or absence of the reproduction signal outputted by the head. In response to the detection signal, the muting circuit and the driver circuit are operated. When no reproduction signal is available, the muting circuit mutes the D/A converter output and the driver suspends the display of the level meter.

The nature, principle and utility of the invention will become more apparent from the following detailed description when read in conjunction with the accompanying drawings.

DESCRIPTION OF THE PREFERRED EMBODIMENTS

Figure 1:
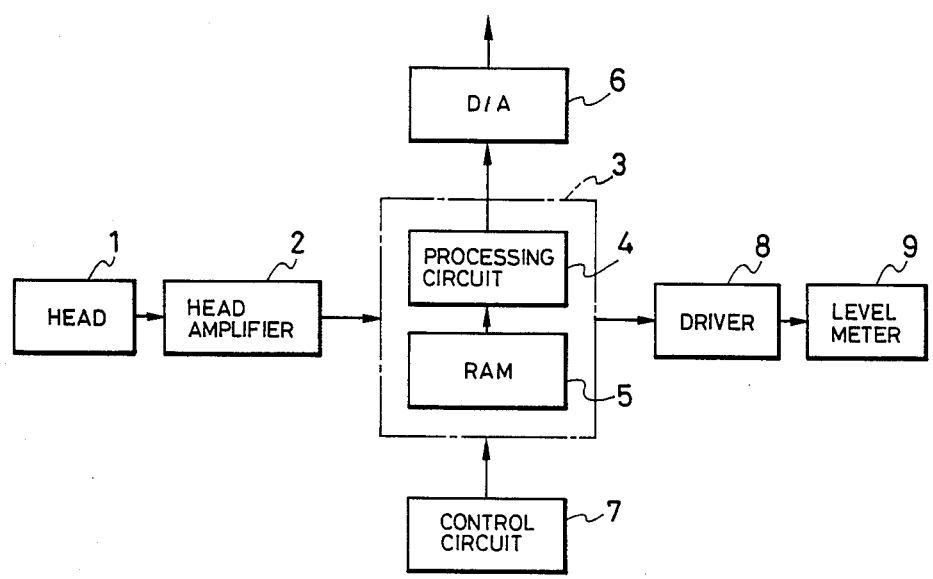
FIG. 1 is a block diagram showing the arrangement of a conventional signal reproducing device.
Figure 2:
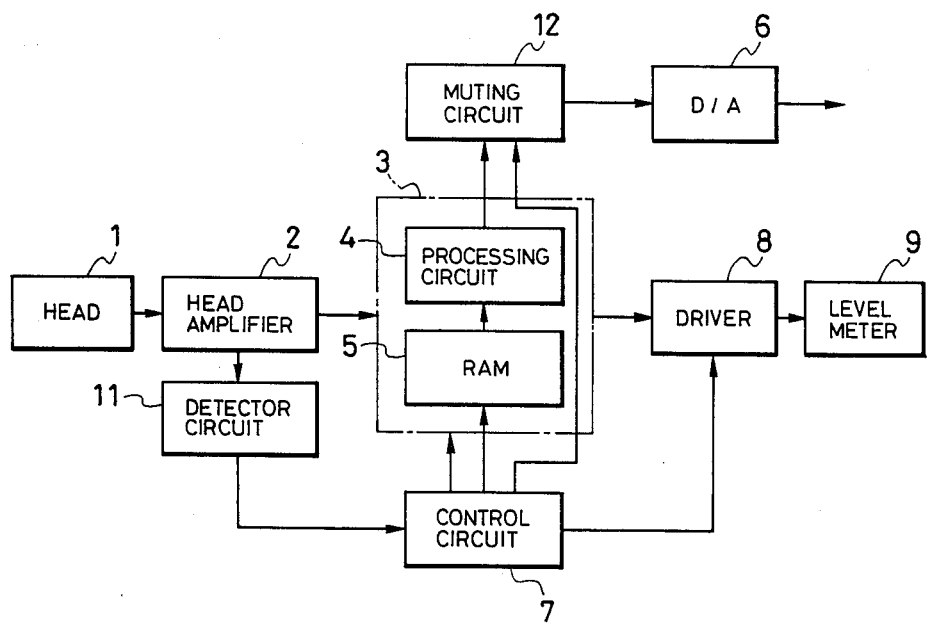
FIG. 2 is a block diagram showing the arrangement of an example of a signal reproducing device according to the invention.

FIG. 2 is a block diagram of an example of an R-DAT to which the technical concept of the invention is applied. In FIG. 2, those components which have been previously described with reference to FIG. 1 are therefore designated by the same reference numerals.

The signal reproducing device as shown in FIG. 2 includes a detector circuit 11 for detecting whether or not the head amplifier 2 is outputting an RF signal to provide a detection signal. The detection signal is applied to the control circuit 7. In response to the detection signal, the control circuit 7 outputs control signals to control the memory 5 and the driver 8. A muting circuit 12 is inserted in the D/A converter signal path. The muting circuit 12 is also controlled by the control circuit 7.

The other circuitry is the same as that in FIG. 1.

The detector circuit 11 samples the envelope of the RF signal with a predetermined period, and when the level of the RF signal envelope thus sampled is a predetermined reference value or higher, it is determined that the RF signal is present, and when not, it is determined that the RF signal is absent. This will be described in more detail.

Figure 3:
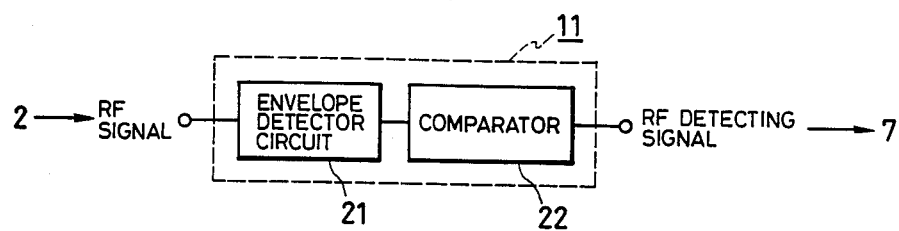
FIG. 3 is a block diagram showing a detector circuit used in the device according to the invention.

As shown in FIG. 3, in the detector circuit 11, the RF signal is applied to a band equalizer, and is then subjected to envelope detection in an envelope detecting circuit 21. The output of the circuit 21 is applied to a comparator 22 where it is compared with a predetermined level. When it is equal to or higher than a predetermined level, the comparator 22 outputs an "H" signal, and when it is not, the comparator 22 outputs an "L" signal. This eliminates the difficulty that noise signals are detected as RF signals.

As described above, the detector circuit 11 outputs an "H" signal when detecting the RF signal of the head amplifier 2. While receiving the "H" signal from the detector circuit 11, the control circuit 7 will not reset (clear) the contents of the memory 5 and will not active the mute circuit 12, and normally operates the driver 8. Accordingly, similar to the signal reproducing device of FIG. 1, the signal read by the head 1 is outputted through the D/A converter circuit 6, and its level is displayed by the level meter 9.

On the other hand, the detector circuit outputs an "L" signal when it detects no RF signal. In response to the "L" signal, the control circuit 7 controls the memory 5, the driver 8 and the muting circuit 12 by clearing the data stored in the memory 5 and driver 8 suspends the supply of the signal to the level meter 9.

Figure 6:
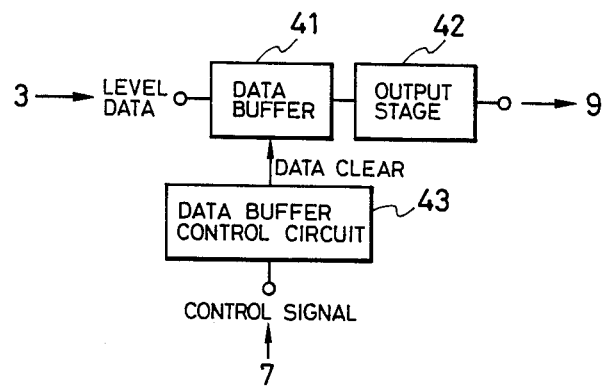
FIG. 6 is a block diagram showing a driver used in the device of the invention.

The driver 8 is designed, for instance, as shown in FIG. 6. In the driver 8, the input data is applied to a data buffer 41, the output of which is supplied to an output stage 42 (composed, for instance, of an output transistor). When the control signal is raised to the "H" level, the content of the data buffer is cleared by a data buffer control circuit 43. The muting circuit 12 mutes the signal applied to the D/A converter circuit 6.

Figure 4:
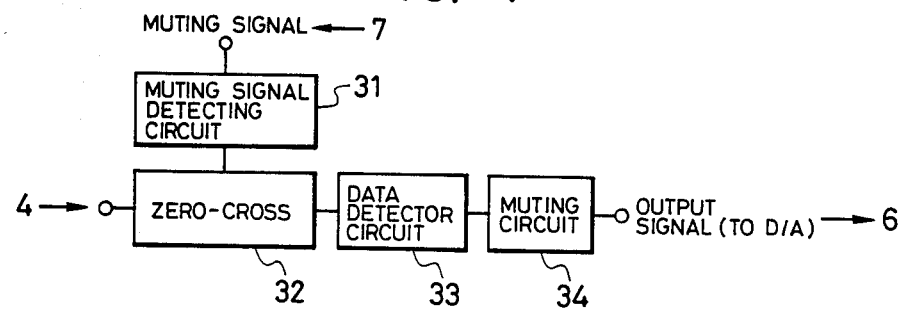
FIG. 4 is a block diagram showing a muting circuit in the device of the invention.
Figure 5:
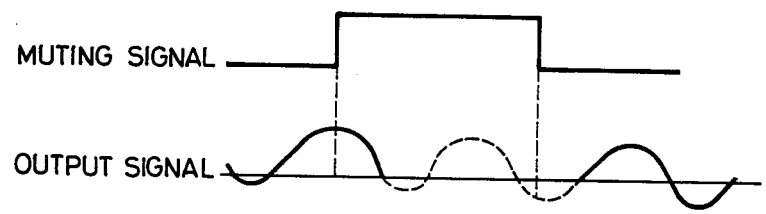
FIG. 5 is a timing chart used for a description of the operation of the muting circuit.

An example of the muting circuit 12 in the signal reproducing device is as shown in FIG. 4. The muting signal from the control circuit 7 is detected by a muting signal detecting circuit 31. When the muting signal is at the "H" level, a zero-crossing detector 32 and a data detecting circuit 33 detect, in combination, whether or not the higher six bits of the data are all "0" or all "1" (the input being a digital signal). When the higher six bits are all "0" or all "1", the output signal is muted, as shown in FIG. 5, whereby the production of noise signals before and after the muting operation is prevented.

Therefore, no DC data remain in the memory 5, and accordingly the difficulties of the DC data remaining therein being outputted as a noise signal, D/A converted by the D/A converter circuit 6, and its level displayed by the level meter 9 are eliminatd.

It is theoretically possible to prevent the production of noise signals and the abnormal display of signal levels on the level meter merely by controlling the driver 8 and the muting circuit 12 without clearing the content of the memory 5. However, clearing the content of the memory 5 can more effectively prevent the difficulty of, when the head reads a data recorded region after a blank region, a noise signal is transiently produced and the level is abnormally displayed.

In the above-described signal reproducing device, the muting circuit 12 is arranged in the front stage of the D/A converter circuit 6. However, it may be provided in the rear stage of the circuit 6. Furthermore, the device may be modified so that the output of the detector circuit 11 is directly (without the control circuit) used to control the memory 5, the driver 8 and the muting circuit 12.

As is apparent from the above description, the signal reproducing device of the invention include the head for reading digital signals recorded on the recording meduim, the memory for storing digital signals outputted by the head, the processing circuit for processing the digital signal stored in the memory, the D/A converter circuit for subjecting the digital signal processed by the processing circuit to D/A conversion, the level meter for displaying the level of the digital signal, the detector circuit for detecting the presence or absence of the reproduction signal outputted by the head; the muting circuit for muting the D/A converted signal and outputted in correspondence to the output of the detector circuit, and the driver for suspending the display of the level meter according to the output of the detector circuit. With this arrangement, the signal reproducing device of the invention is free from the difficulties of, in the blank regions, noise signals being produced and abnormal indications being made by the level meter.

What is claimed is:

1. A signal reproducing device comprising:
   a magnetic head for reading digital signals recorded on a recording medium;
   a memory for storing digital signals outputted by said head;
   means for processing said digital signal stored in said memory;
   a digital-to-analog converter circuit for subjecting said digital signal processed by said processing means to digital-to-analog conversion;
   a level meter for displaying the level of said digital signal;
   means for detecting the presence or absence of a reproduction signal outputted by said head;
   means for muting a digital-to-analog converted signal outputted according to an output of said detecting means; and
   a driver for suspending the display of said level meter according to an output of said detecting means.

2. A signal reproducing device comprising:
   a magnetic head for reading digital signals recorded on a recording medium;
   a memory for storing digital signals outputted by said head;
   means for processing said digital signal stored in said memory;
   a digital-to-analog converter circuit for subjecting said digital signal processed by said processing means to digital-to-analog conversion;
   a level meter for displaying the level of said digital signal;
   means for detecting the presence or absence of a reproduction signal outputted by said head;
   means for muting a digital-to-analog converted signal outputted according to an output of said detecting means;
   a driver for suspending the display of said level meter according to an output of said detecting means; and
   means for resetting a content of said memory according to said output of said detecting means.

3. The signal reproducing device of claim 1, further comprising a control circuit connected to said detecting means, said muting means and said driver, said control circuit operable, when said detecting means detects the absence of the reproduction signal outputted by said head, for causing said muting means to mute the outputted digital-to-analog converted signal, and for causing said driver to suspend the display of said level meter.

4. The signal reproducing device of claim 1, wherein said detecting means comprises an envelope detector circuit for detecting the envelope of an output signal from said magnetic head, and a comparator for comparing a level of the detected envelope to a predetermined level.

5. The signal reproducing device of claim 3, wherein said muting means comprises a muting signal detecting circuit for detecting a muting signal from said control circuit, a zero-crossing detector circuit connected to an output of said processing means, a data detecting circuit connected to an output of said zero-crossing detector circuit, and a muting circuit connected to an output of said data detecting circuit for muting an output of said digital-to-analog converter circuit.

6. The signal reproducing device of claim 3, wherein said driver circuit comprises an input data buffer for receiving level data from said processing means indicating the level of said digital signal, an output stage connected to said input data buffer and a data buffer control circuit connected to said input data buffer and to said control circuit, said data buffer control circuit causing the contents of said input data buffer to be reset when said control circuit supplies a control signal indicating that said detecting means detects the absence of a reproduction signal outputted by said head.

* * * * *